(12) United States Patent
Mooppanar et al.

(10) Patent No.: US 11,238,436 B2
(45) Date of Patent: Feb. 1, 2022

(54) SYSTEM AND COMPUTER IMPLEMENTED METHOD FOR SHARING EXPENSES USING A DUAL-CHIP PAYMENT CARD

(71) Applicant: Visa International Service Association, San Francisco, CA (US)

(72) Inventors: Alkondan Chockalinga Mooppanar, Kottar (IN); Sudhir Krishna V L, Kasaragod (IN); Rakesh Ramamurthy, Kathriguppe (IN); Rajeev Gangapura Cho Iyer, CV Raman Nagar (IN); Sriram Sethumadhavan, Electronic City (IN)

(73) Assignee: Visa International Service Association, San Francisco, CA (US)

( * ) Notice: Subject to any disclaimer, the term of this patent is extended or adjusted under 35 U.S.C. 154(b) by 52 days.

(21) Appl. No.: 16/519,128

(22) Filed: Jul. 23, 2019

(65) Prior Publication Data

US 2021/0027275 A1    Jan. 28, 2021

(51) Int. Cl.
| | |
|---|---|
| *G06Q 40/00* | (2012.01) |
| *G06Q 20/34* | (2012.01) |
| *G06K 19/07* | (2006.01) |
| *G06Q 20/22* | (2012.01) |

(52) U.S. Cl.
CPC ......... *G06Q 20/341* (2013.01); *G06K 19/072* (2013.01); *G06Q 20/29* (2013.01)

(58) Field of Classification Search
CPC ..... G06Q 20/341; G06Q 20/20; G06K 19/072
See application file for complete search history.

(56) References Cited

U.S. PATENT DOCUMENTS

| | | | |
|---|---|---|---|
| 6,572,015 B1 * | 6/2003 | Norton | B60R 25/02 235/375 |
| 6,604,685 B1 * | 8/2003 | Norton | G06K 7/1097 235/492 |
| 6,616,054 B1 * | 9/2003 | Norton | G06K 7/0008 235/492 |
| 6,705,531 B1 * | 3/2004 | Norton | G06K 7/0008 235/375 |
| 2005/0182724 A1 * | 8/2005 | Willard | G06Q 20/04 705/44 |
| 2005/0192892 A1 * | 9/2005 | Willard | G06Q 40/00 705/39 |

(Continued)

*Primary Examiner* — Rajesh Khattar
(74) *Attorney, Agent, or Firm* — The Webb Law Firm (57) ABSTRACT

The present disclosure relates to a transaction processing system and a method for sharing expenses among multiple peers using a dual-chip payment card. The method includes receiving a request for creating a temporary pool session for a plurality of users from one of the plurality of users having a dual-chip payment card. In response to the request, the method includes creating the temporary pool session, holding a proportional credit amount of each of the plurality of users. Subsequently, the method includes associating the temporary pool session with a secondary chip of the dual-chip payment card of at least one of the plurality of users. Finally, the method includes processing one or more transaction requests received through the secondary chip of the dual-chip payment card of at least one of the plurality of users, using the temporary pool session.

4 Claims, 8 Drawing Sheets

(56) References Cited

U.S. PATENT DOCUMENTS

| | | | | |
|---|---|---|---|---|
| 2011/0102153 A1* | 5/2011 | Rancien | ............... | G07D 7/01 |
| | | | | 340/10.1 |
| 2012/0290474 A1* | 11/2012 | Hoke | ............... | G06Q 30/04 |
| | | | | 705/40 |
| 2014/0067667 A1* | 3/2014 | Blanco | ............... | G06Q 20/28 |
| | | | | 705/41 |
| 2014/0164221 A1* | 6/2014 | Sinton | ............... | G06Q 20/22 |
| | | | | 705/39 |
| 2015/0142657 A1* | 5/2015 | Sagastiverza | ......... | G06Q 20/32 |
| | | | | 705/44 |
| 2016/0284022 A1* | 9/2016 | Weigold | ............... | G06Q 40/06 |
| 2020/0005579 A1* | 1/2020 | Vu | ............... | G06Q 20/34 |

* cited by examiner

SYSTEM AND COMPUTER IMPLEMENTED METHOD FOR SHARING EXPENSES USING A DUAL-CHIP PAYMENT CARD

TECHNICAL FIELD

The present disclosure relates to dual-chip payment cards. Particularly, but not exclusively, the present disclosure relates to a system and a computer implemented method for sharing expenses among a group of users using a dual-chip payment card.

BACKGROUND

Generally, a group of individuals often gets involved in collective expenses like parties, holiday plans, gift presents and the like, which need to be shared amongst them. However, calculating payments and sharing the expenses evenly among each member of the group is a complicated and inconvenient task.

Presently, sharing the expenses amongst the group of individuals involves using multiple payment cards during a payment, such that a merchant needs to calculate and receive proportional shares from each individual. In some other instances, a single member of the group may make the payment of the expenses, divide it among the group and wait until each member of the group returns their share of the payment. Thus, the existing approaches cause inconvenience to either the merchant or the person who is making the payment on behalf of the group.

Therefore, there exists need for a simple and convenient method for sharing the expenses amongst a group of initials.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

Disclosed herein is a computer-implemented method that may include, receiving a request for creating a temporary pool session for a plurality of users from one of the plurality of users having a dual-chip payment card. Further, the method may include creating the temporary pool session for holding a proportional credit amount of each of the plurality of users. The temporary pool session may be associated with a session identifier. Furthermore, the method may include associating the temporary pool session with a secondary chip of the dual-chip payment card of at least one of the plurality of users. Finally, the method may include processing one or more transaction requests, received through the secondary chip of the dual-chip payment card of at least one of the plurality of users, using the temporary pool session.

Further, in an embodiment, the present disclosure may include a transaction processing system. The transaction processing system may include a processor and a memory. The memory may be communicatively coupled to the processor and store processor-executable instructions, which, on execution, cause the processor to receive a request for creating a temporary pool session for a plurality of users from one of the plurality of users having a dual-chip payment card. Further, the instructions may cause the processor to create the temporary pool session for holding a proportional credit amount of each of the plurality of users, wherein the temporary pool session is associated with a session identifier. Furthermore, the instructions may cause the processor to associate the temporary pool session with a secondary chip of the dual-chip payment card of at least one of the plurality of users. Finally, the instructions may cause the processor to process one or more transaction requests, received through the secondary chip of the dual-chip payment card of at least one of the plurality of users, using the temporary pool session.

Further, in an embodiment, the present disclosure may include a non-transitory computer readable medium including instructions stored thereon that when processed by at least one processor causes a device to perform operations including receiving a request for creating a temporary pool session for a plurality of users from one of the plurality of users having a dual-chip payment card. Further, the instructions cause the device to perform creation of the temporary pool session for holding a proportional credit amount of each of the plurality of users, wherein the temporary pool session is associated with a session identifier. Furthermore, the instructions may cause the device to perform an association of the temporary pool session with a secondary chip of the dual-chip payment card of at least one of the plurality of users. Finally, the instructions may cause the device to process one or more transaction requests, received through the secondary chip of the dual-chip payment card of at least one of the plurality of users, using the temporary pool session.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure relates to a transaction processing system and a computer implemented method for sharing expenses among multiple peers using a dual-chip payment card. In some embodiments, the method comprises receiving a request for creating a temporary pool session for a plurality of users from one of the plurality of users having a dual-chip payment card. In response to the request, the method comprises creating the temporary pool session, which holds a proportional credit amount of each of the plurality of users. Subsequently, method comprises associating the temporary pool session with a secondary chip of the dual-chip payment card of at least one of the plurality of users, who would be monitoring an aggregate credit among in the temporary pool session. Finally, the method comprises processing one or more transaction requests received through the secondary chip of the dual-chip payment card of at least one of the plurality of users, using the temporary pool session.

In some embodiments, the transaction processing system and the computer-implemented method of present disclosure provide a convenient way for a plurality of users to share the expenses of an event, for example, an outdoor visit, a party, a celebration and the like. Moreover, the present disclosure suggests an effective use of the dual-chip payment cards for splitting and/or proportionally sharing the expenses among a plurality of users.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
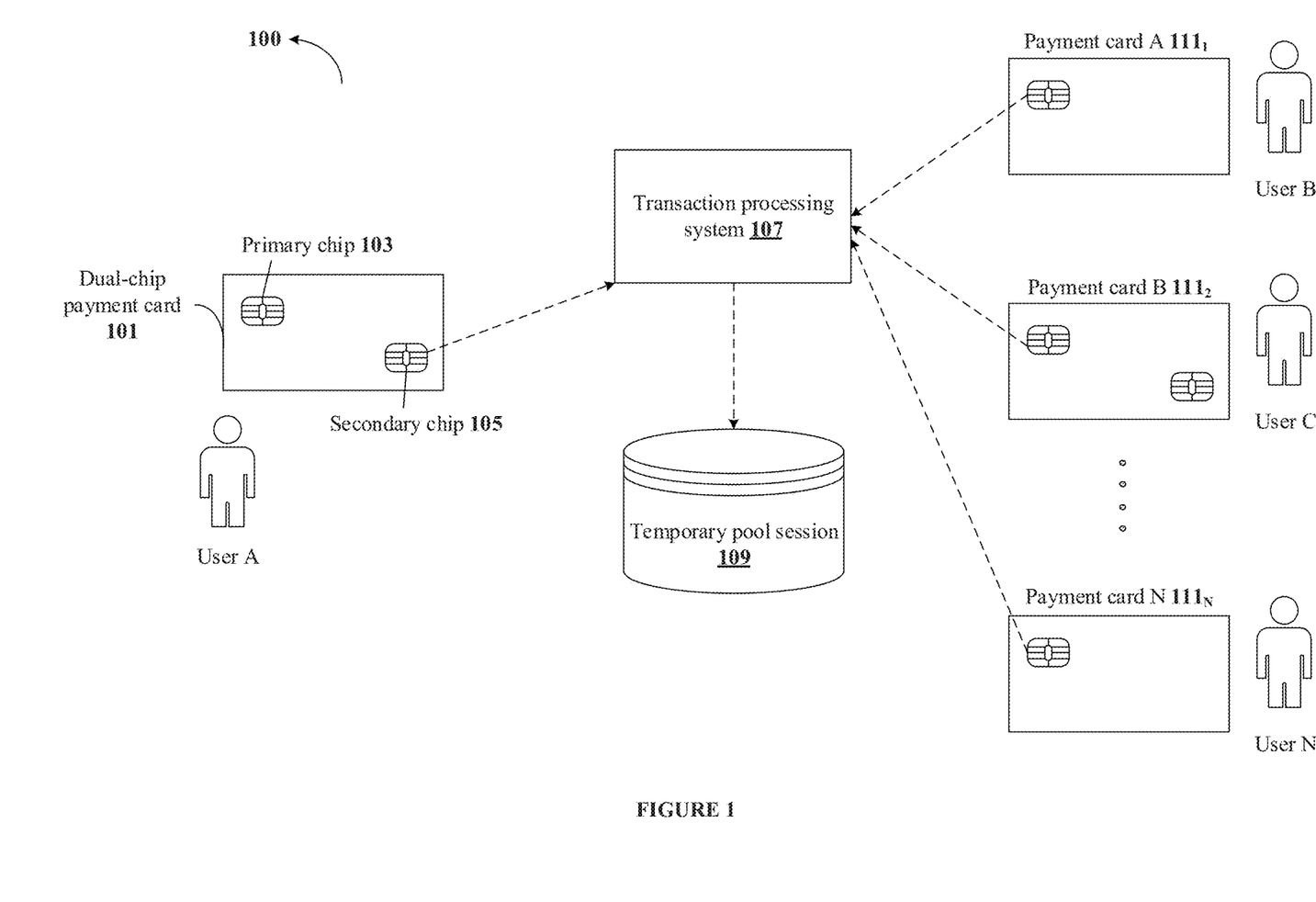
FIG. 1 shows an exemplary environment illustrating a method of sharing expenses using a dual-chip payment card in accordance with some embodiments of the present disclosure.

FIG. 1 shows an exemplary environment illustrating a method of sharing expenses using a dual-chip payment card 101 in accordance with some embodiments of the present disclosure.

In some implementation, the environment 100 may include a plurality of users, namely user A, user B, . . . , user N and a transaction processing system 107. As an example, the plurality of users may be a group of friends, family or peers, who intend to share and/or split the expenses of an event. In some embodiments, at least one of the plurality of users may possess a dual-chip payment card 101. For the purpose of illustration, in FIG. 1, user A is shown as possessing the dual-chip payment card 101. Further, in some embodiments, a first chip and/or a primary chip 103 of the dual-chip payment card 101 may be linked to a primary account of user A. Similarly, the secondary chip 105 of the dual-chip payment card 101 may be linked to a secondary account of user A. Here, primary account of user A may refer to a regular account, for example, a savings account of user A. The secondary account of user A may refer to a temporary account of user A, which may be identified by a Virtual Permanent Account Number (VPAN) corresponding to the primary account of user A. As an example, the dual-chip payment card 101 may be a dual-chip credit card or a dual-chip debit card of user A.

In some embodiments, the transaction processing system 107 may be a computing system, which may be configured to receive a request from one of the plurality of users and create a temporary pool session 109 for the plurality of users, based on the request. As an example, the computing system may include, without limiting to, a smartphone, a Personal Digital Assistant (PDA), a desktop computer or a server computing system. In some embodiments, the plurality of users may interact with the transaction processing system 107 using a medium such as, for example, a mobile application installed in smartphone of the plurality of users.

In some embodiments, when there is a requirement of sharing/splitting expenses between the plurality of users, user A may generate a request to the transaction processing system 107 for creating a temporary pool session 109 for the plurality of users. In some embodiments, the request generated by user A may include, without limiting to, number of users participating in the temporary pool session 109, a proportional credit amount to be collected from each of the plurality of users, an expiration time for the temporary pool session 109 and other user credentials, for example, details of the primary account and the secondary accounts of the plurality of users.

In some embodiments, upon receiving the request from user A, the transaction processing system 107 may validate the request received from user A and create the temporary pool session 109 for holding the proportional credit amount specified in the request. Also, the transaction processing system 107 may associate a unique session identifier to the temporary pool session 109. Subsequently, the transaction processing system 107 may provide details of the temporary pool session 109 to each of the plurality of users, who have been registered to participate in the temporary pool session 109. As an example, the details of the temporary pool session 109 may include, an access code for using the temporary pool session 109 and the session identifier of the temporary pool session 109. In some embodiments, without limitation, any of the payment cards—payment card A $111_1$, payment card B $111_2$, ..., payment card N $111_N$ belonging to the users—user B, user C, ..., user N respectively, may be a dual-chip payment card and used for creating the temporary pool session.

In some embodiments, each of the plurality of users may credit the proportional credit amount in the temporary pool session 109 using the details of the temporary pool session 109. In some embodiments, the plurality of users may credit the proportional credit amount to the temporary pool session 109 from the primary account of the plurality of users.

In some embodiments, upon creating the temporary pool session 109, the transaction processing system 107 may associate the temporary pool session 109 with the secondary chip 105 of the dual-chip card of the at least one of the plurality of users. For example, in the environment 100, the temporary pool session 109 may be associated with the secondary chip 105 of the dual-chip payment card 101 of user A, since user A had initiated the request for creating the temporary pool session 109. Subsequently, the one or more transactions through the temporary pool session 109 may be carried out using the secondary chip 105 of the dual-chip payment card 101, which is associated with the temporary pool session 109. In some embodiments, suppose if user C also possesses a dual-chip payment card 101 as shown in environment 100, then the temporary pool session 109 may be associated with the secondary chip 105 of the dual-chip payment card 101 of user C as well.

In some embodiments, after associating the temporary pool session 109 with the secondary chip 105 of the dual-chip payment card 101 of one of the plurality of users, the transaction processing system 107 may process the one or more transaction requests through the temporary pool session 109. As an example, a transaction request may be generated when one of the plurality of users intend to make a payment and/or transaction with the proportional credit amount pooled into the temporary pool session 109. In some embodiments, the one or more transactions may be processed when the secondary chip 105 of the dual-chip payment card 101 associated with the temporary pool session 109 is used for the payment/transaction.

In some embodiments, the transaction processing system 107 may automatically suspend and/or terminate the temporary pool session 109 upon expiry of a configurable time period or upon receiving an explicit request from one of the plurality of users having the dual-chip payment card 101. As an example, the configurable time period may be 2 days, such that the temporary pool session 109 expires after being active for 2 days from the time of creation of the temporary pool session 109. In some embodiments, upon expiry of the temporary pool session 109, the transaction processing system 107 may credit and/or return a proportional amount of an unused credit amount remaining in the temporary pool session 109 to each of the plurality of users. Additionally, the plurality of users may also extend the expiry of the temporary pool session 109 based on the requirements.

Thus, the method and the transaction processing system 107 of the present disclosure assist a plurality of users in conveniently sharing and/or splitting the expenses of an event. Also, the present disclosure relieves the plurality of users from the burden of collecting and/or recovering the expenses from other users once the event has been concluded.

Figure 2:
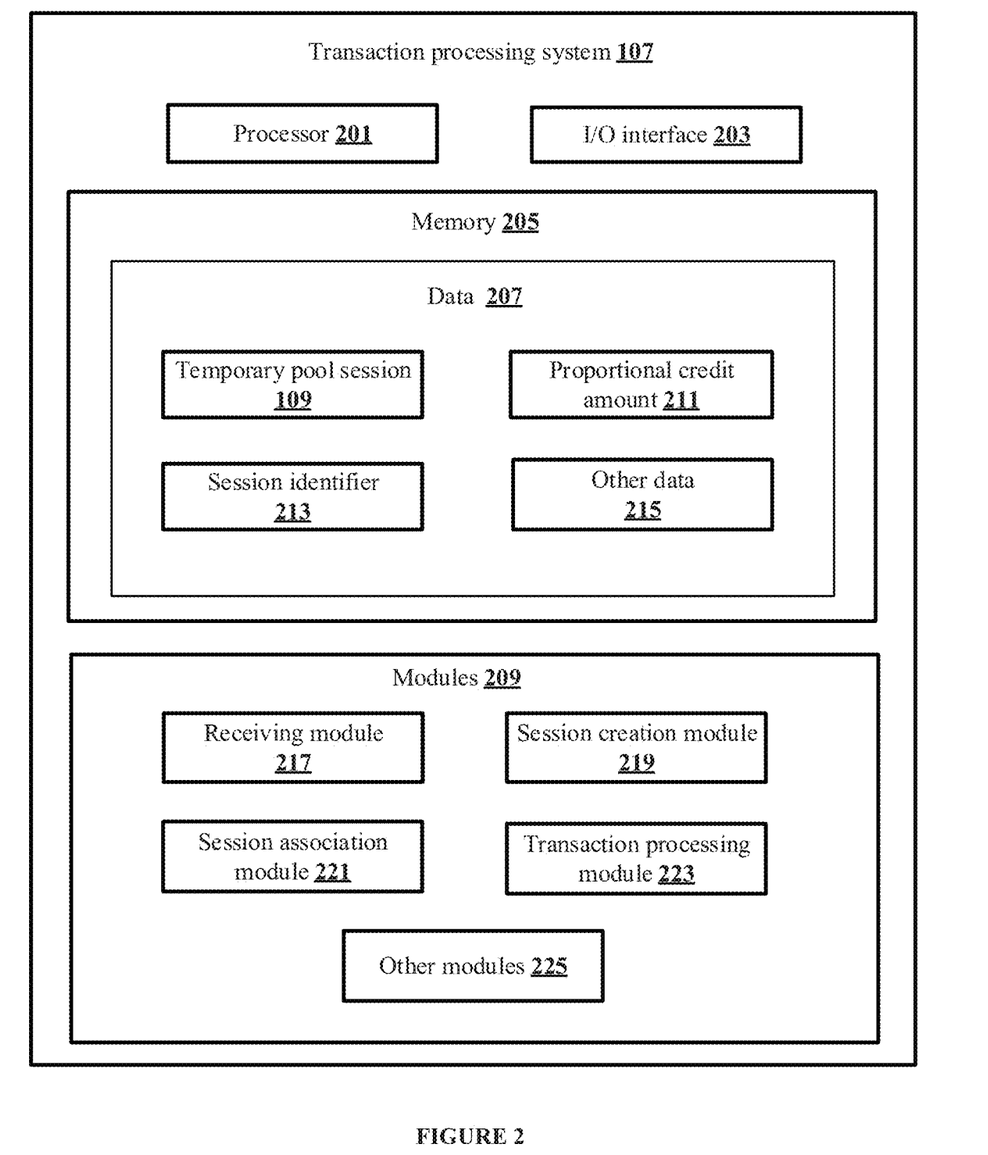
FIG. 2 shows a detailed block diagram of a transaction processing system in accordance with some embodiments of the present disclosure.

FIG. 2 shows a detailed block diagram of a transaction processing system 107 in accordance with some embodiments of the present disclosure.

In some implementations, the transaction processing system 107 may include a processor 201, a I/O interface 203 and a memory 205. The processor 201 may be used to perform various functions of the transaction processing system 107 using the data and the modules stored in the memory 205. The I/O interface 203 may be used for interfacing the transaction processing system 107 with one or more external computing devices, for example, a smartphone of the plurality of users for receiving a request for creating a temporary pool session 109. In some embodiments, the data 207 may be stored in a memory 205 configured in the transaction processing system 107 as shown in the FIG. 2. As an example, the data 207 may include the temporary pool session 109, a proportional credit amount 211, a session identifier 213 and other data 215.

In some embodiments, the data 207 may be stored in the memory 205 in form of various data structures. Additionally, the data 207 can be organized using data models, such as relational or hierarchical data models. The other data 215 may store data, including temporary data and temporary files, generated by the modules 209 for performing the various functions of the transaction processing system 107.

In some embodiments, the temporary pool session 109 may be a virtual pool of money, which is created by the transaction processing system 107 for maintaining a proportional credit among received from each of the plurality of users. The temporary pool session 109 is associated with a session identifier 213 and linked with a secondary chip 105 of the dual-chip payment card 101 of the at least one of the plurality of users. In other words, the temporary pool session 109 may be considered as a temporary wallet, which remains active and maintains a certain credit amount until it is expired and/or terminated.

In some embodiments, the proportional credit amount 211 may be the credit amount received from each of the plurality of users. As an example, suppose, if total expenditure of an event is estimated to be USD 10,000 and there are four users, then the proportional credit amount 211 may be calculated as USD 2500 for each of the four users. That is, each of the four users may contribute a credit amount of USD 2500 to the temporary pool session 109. In some embodiments, the value of proportional credit amount 211 may be dynamically customized and/or altered by any of the plurality of users. As an example, suppose there are four users A, B, C and D and user A decides to pay the expenditure of an additional user E, then the proportional credit amount 211 to be received from User A would be USD 5000. However, user B, user C and user D may contribute only USD 2500. Similarly, in another scenario, user A, user B and user C may decide to exclude user D from sharing the expenditures of the event, in which case, the proportional credit amount 211 may be shared among and collected from user A, user B and user C only.

In some embodiments, the session identifier 213 may be the unique identifier corresponding to the temporary pool session 109. As an example, the session identifier 213 may be used to identify the temporary pool session 109 to which the plurality of users may have to transfer the proportional credit amount 211. Further, in the scenarios where the dual-chip payment card 101 of a single user is associated with multiple temporary pool sessions, the session identifiers may be used to differentiate the temporary pool sessions.

In some embodiments, each of the data 207 stored in the memory 205 may be processed by the modules 209 of the transaction processing system 107. The modules 209 may be stored within the memory 205. In an example, the modules 209 may be communicatively coupled to the processor 201 configured in the transaction processing system 107. Alternatively, the modules 209 may also be present outside the memory 205 as shown in FIG. 2 and implemented as hardware. As used herein, the term modules 209 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 209 may include, for example, a receiving module 217, a session creation module 219, a session association module 221, a transaction processing module 223 and other modules 225. The other modules 225 may be used to perform various miscellaneous functionalities of the transaction processing system 107. It will be appreciated that such aforementioned modules 209 may be represented as a single module or a combination of different modules.

In some embodiments, the receiving module 217 may be configured for receiving a request for creating the temporary pool session 109 from one of the plurality of users having the dual-chip payment card 101. As an example, the request for creating the temporary pool session 109 may be received through a mobile application installed on a smartphone of the user requesting the creation of temporary pool session 109.

In some embodiments, the session creation module 219 may be configured for creating the temporary pool session 109 upon receiving and validating the request for creating the temporary pool session 109. In some embodiments, the session creation module 219 may create the temporary pool session 109 in accordance with various session parameters specified in the request. As an example, the session parameters may include, without limiting to, the proportional credit amount 211 to be collected from each of the plurality of users, the configurable time period for expiration of the temporary pool session 109, a Permanent Account Number (PAN) and other details of the user.

In some embodiments, the session association module 221 may be configured for associating the temporary pool session 109 with the secondary chip 105 of the dual-chip payment card 101 of one of the plurality of users. In some embodiments, the session association module 221 may associate the temporary pool session 109 with the dual-chip payment card 101 of the user, who has requested the creation of the temporary pool session 109. Alternatively, the session association module 221 may associate the temporary pool session 109 with any of the plurality of users having a dual-chip payment card 101, upon receiving an association request from one of the plurality of users.

In some embodiments, the transaction processing module 223 may be configured for processing the one or more transactions in the temporary pool session 109. In some embodiments, the transaction processing module 223 keep a track of various transaction parameters such as, balance credit amount in the temporary pool session 109, a transaction limit and the like. As an example, the balance credit amount may be total credit amount remaining in the temporary pool sessions 109 at the end of each transaction. Similarly, the transaction limit may be a predefined maximum value of the transaction that the user may be allowed to perform using the temporary pool session 109. In some embodiments, the transaction processing module 223 may generate alerts and/or notifications to the plurality of users, when a transaction value is beyond the transaction limit.

Figure 3:
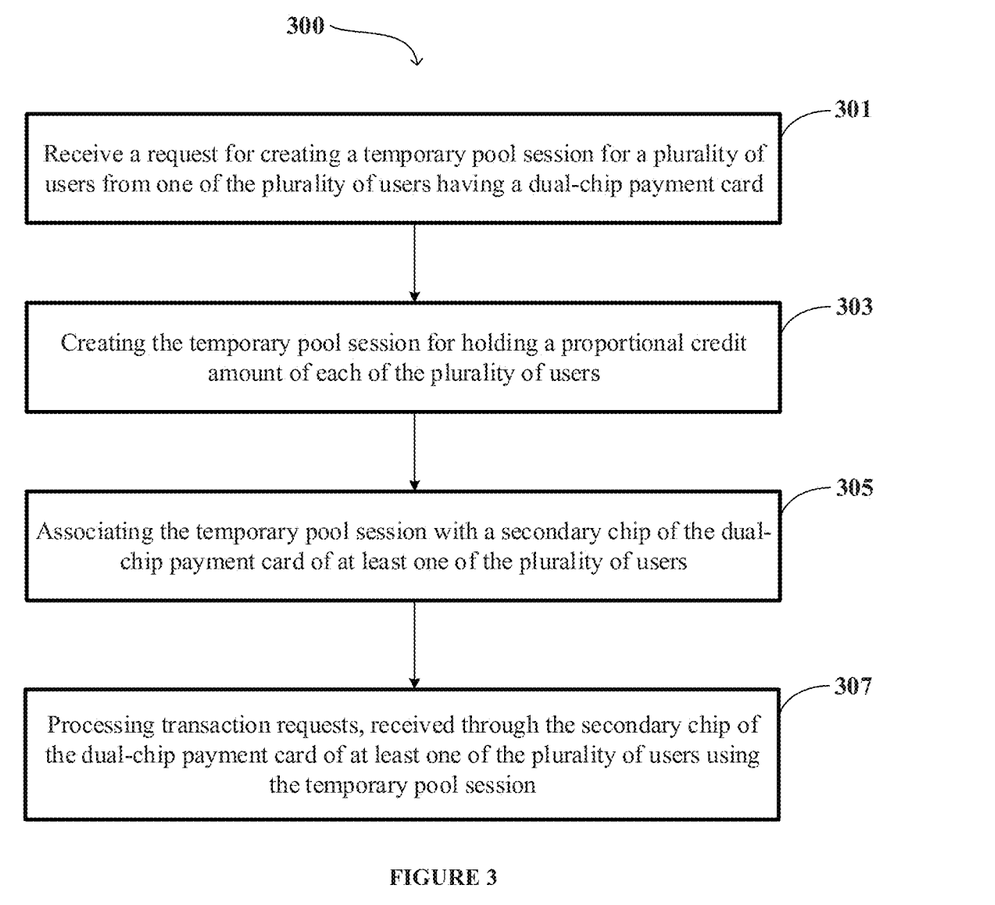
FIG. 3 shows a flowchart illustrating a method of sharing expenses using a dual-chip payment card in accordance with some embodiments of the present disclosure.

FIG. 3 shows a flowchart illustrating a method of sharing expenses using a dual-chip payment card 101 in accordance with some embodiments of the present disclosure.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 201 of a transaction processing system 107, a request, for creating a temporary pool session 109 for a plurality of users, from one of the plurality of users having a dual-chip payment card 101.

At block 303, the method 300 may include creating, by the processor 201, the temporary pool session 109 for holding a proportional credit amount 211 of each of the plurality of users. In some embodiments, the temporary pool session 109 may be associated with a session identifier 213. Further, in some embodiments, the temporary pool session 109 may expire after a configurable time period or upon request from one of the plurality of users having the dual-chip payment card 101.

At block 305, the method 300 may include associating, by the processor 201, the temporary pool session 109 with a secondary chip 105 of the dual-chip payment card 101 of at least one of the plurality of users. In some embodiments, a primary chip 103 of the dual-chip payment card 101 of the plurality of users may be linked to a primary account of corresponding plurality of users. Similarly, a secondary chip 105 of the dual-chip payment card 101 of the plurality of users may be linked to one or more secondary accounts of the corresponding plurality of users.

At block 307, the method 300 may include processing, by the processor 201, one or more transaction requests, received through the secondary chip 105 of the dual-chip payment card 101 of at least one of the plurality of users, using the temporary pool session 109. In some embodiments, processing the one or more transaction requests may comprise validating the one or more transaction requests based on the session identifier 213 associated with the temporary pool session 109.

In some embodiments of the present disclosure, at an instance of time, the secondary chip 105 of the dual-chip payment card 101 of the plurality of users may be configurable to be associated with one or more temporary pool sessions.

In some embodiments of the present disclosure, the method 300 may comprise proportionally crediting an unused amount in the temporary pool session 109 to each of the plurality of users upon expiry of the temporary pool session 109.

Figure 4A:
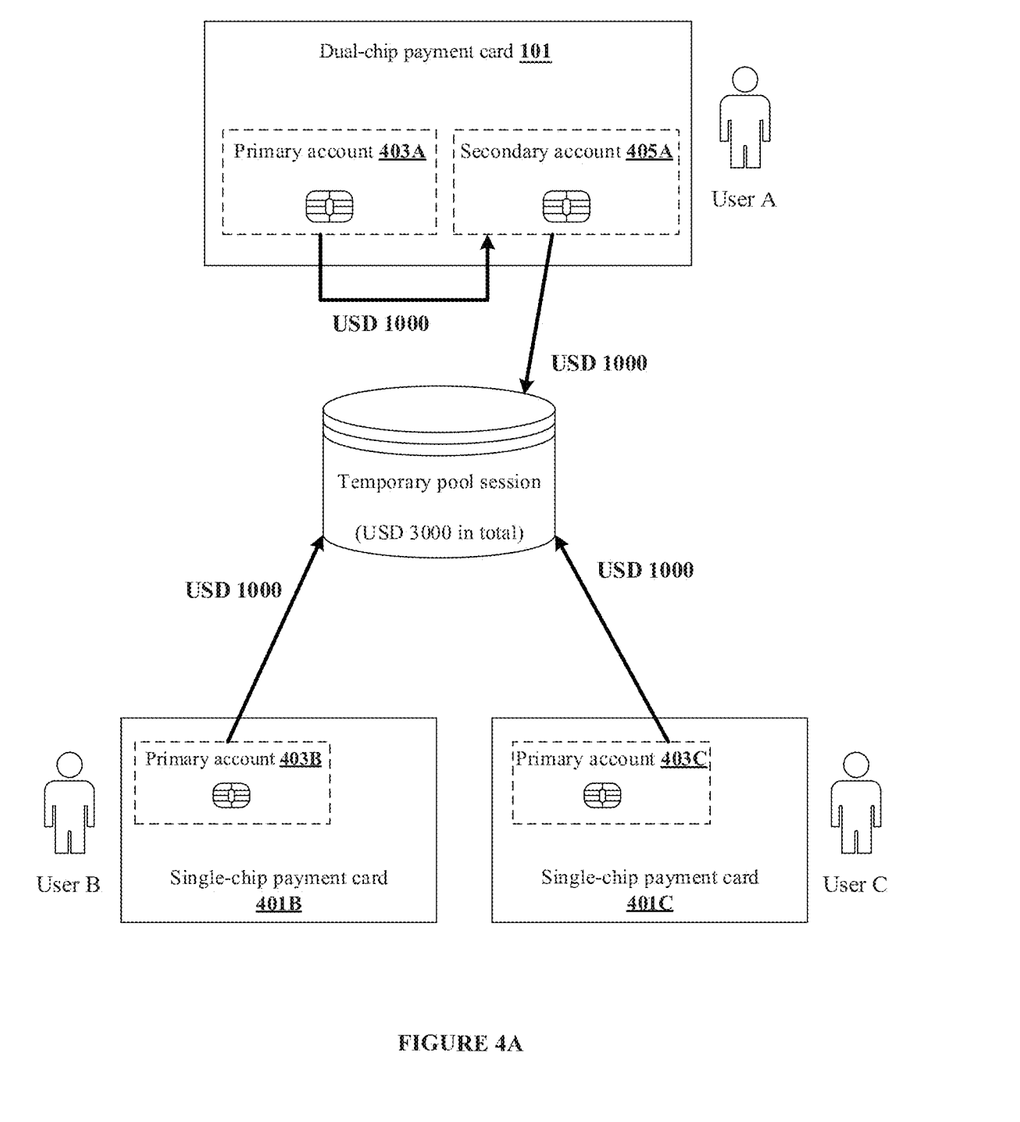
FIGS. 4A and 4B illustrate exemplary scenarios of carrying out one or more transactions using a temporary pool session in accordance with some embodiments of the present disclosure.
Figure 4B:
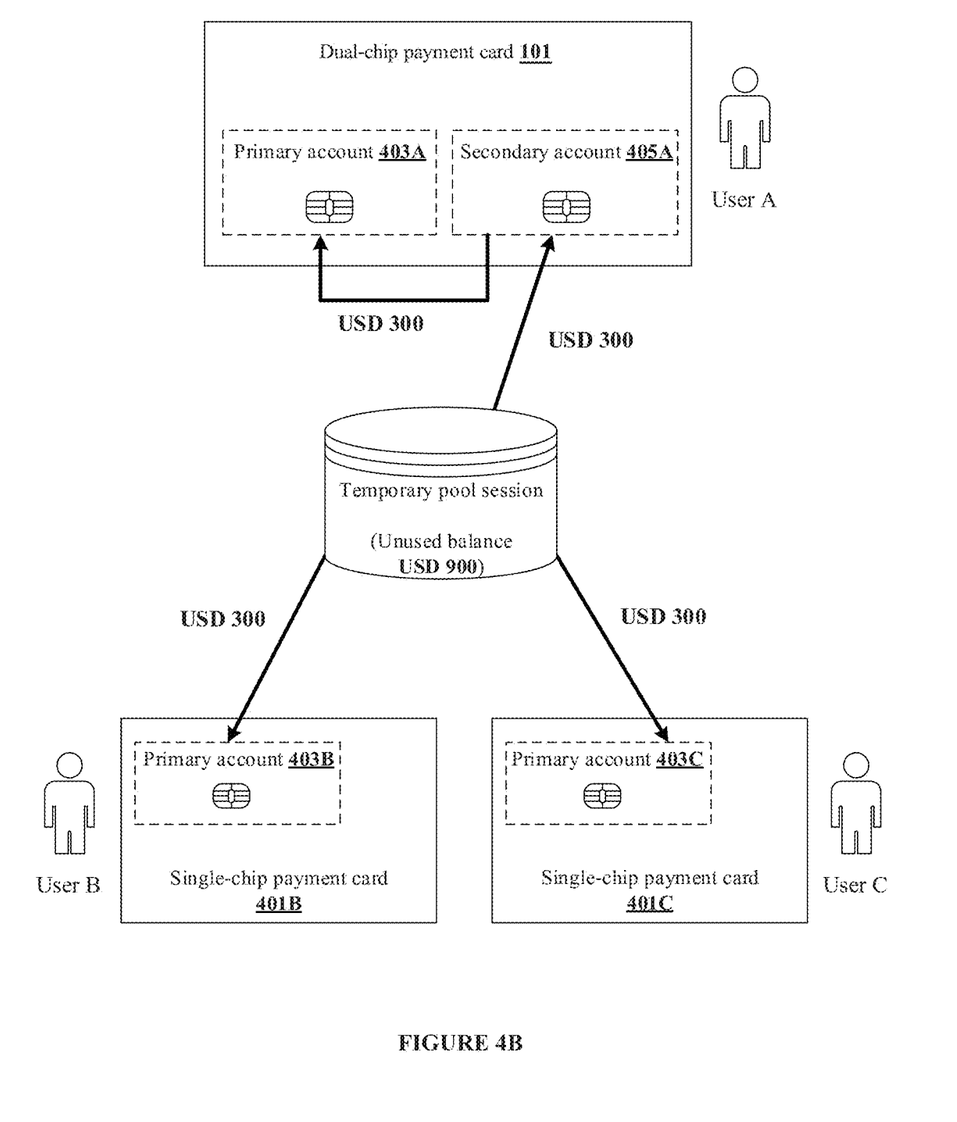

FIGS. 4A and 4B illustrate exemplary scenarios of carrying out one or more transactions using a temporary pool session in accordance with some embodiments of the present disclosure.

FIG. 4A illustrates an exemplary scenario of creating a temporary pool session 109. Suppose, there are 3 users namely, User A, User B and User C, participating in an event and each of the three users decide on sharing the expenditure of the event. Further, suppose one of the three users, for example User A, possesses a dual-chip payment card 101, in which, the primary chip 103 is linked to a primary account 403A of User A and the secondary chip is linked to a secondary account 405A of User A. Also, suppose User B and User C have single-chip payment cards 401B and 401C respectively, which are linked to primary accounts of User B and User C respectively. Suppose, total expenditure of the event is estimated to be USD 3000.

In an embodiment, since User A has the dual-chip payment card 101, User A may request creation of a temporary pool session 109 for holding the total credit amount of USD 3000. In this scenario, since there are three users, the total credit amount may be proportionally shared among the three users, such that, each of the three users contribute an amount of USD 1000 into the temporary pool session 109. Here, User A may contribute his/her part of the credit amount from the primary account 403A. Further, User B and User C may contribute their part of the credit amount from the primary accounts 403B and 403C respectively. Thereafter, the temporary pool session 109 may be associated with the secondary chip of the dual-chip payment card 101 of User A. Consequently, the total credit amount of USD 3000, pooled into the temporary pool session 109, may be maintained in the secondary account 405A of User A. Subsequently, whenever a transaction has to be completed, User A may use the secondary chip of his/her dual-chip payment card 101 for completing the payment/transaction. Alternatively, in some embodiments, if user B and/or user C also possess a dual-chip payment card, then the transaction through the temporary pool session may be completed using the dual-chip payment card of either user A, user B or user C. In other words, only the users having a dual-chip payment card and whose secondary chip is associated with the temporary pool session may carry out transactions using the temporary pool session.

FIG. 4B illustrates an exemplary scenario of returning and/or crediting an unused amount of the temporary pool session 109 into the plurality of users. Suppose, in the above example, USD 900 was left unused from the total pool amount of USD 3000. Here, the unused balance of USD 900 may be proportionally split among the three users, such that each of the three users are credited an amount of USD 300 from the temporary pool session 109. In some embodiments, for user A, the balance credit amount of USD 300 may be transferred from the secondary account 405A to the primary account 403A of user A. Similarly, for user B and user C the balance credit of USD 300 may be credited back to the primary account 403B and 403C of user B and user C respectively. Once the unused balance amount is suitably credited to the accounts of the users, the temporary pool session 109 may be terminated.

Figure 5A:
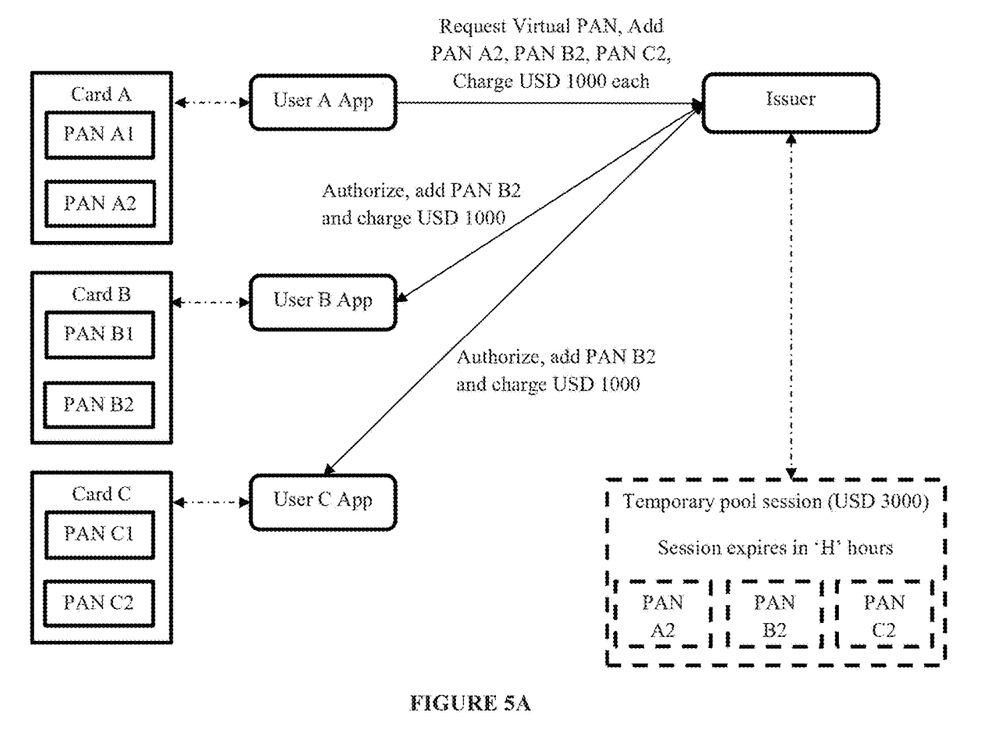
FIGS. 5A, 5B and 5C illustrate exemplary scenarios of using the temporary pool session for performing a transaction in accordance with some embodiments of the present disclosure.
Figure 5B:
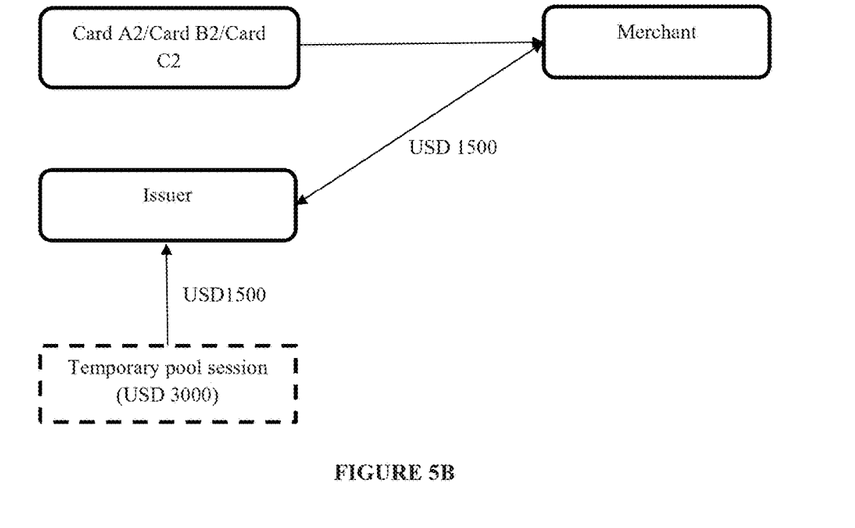
Figure 5C:
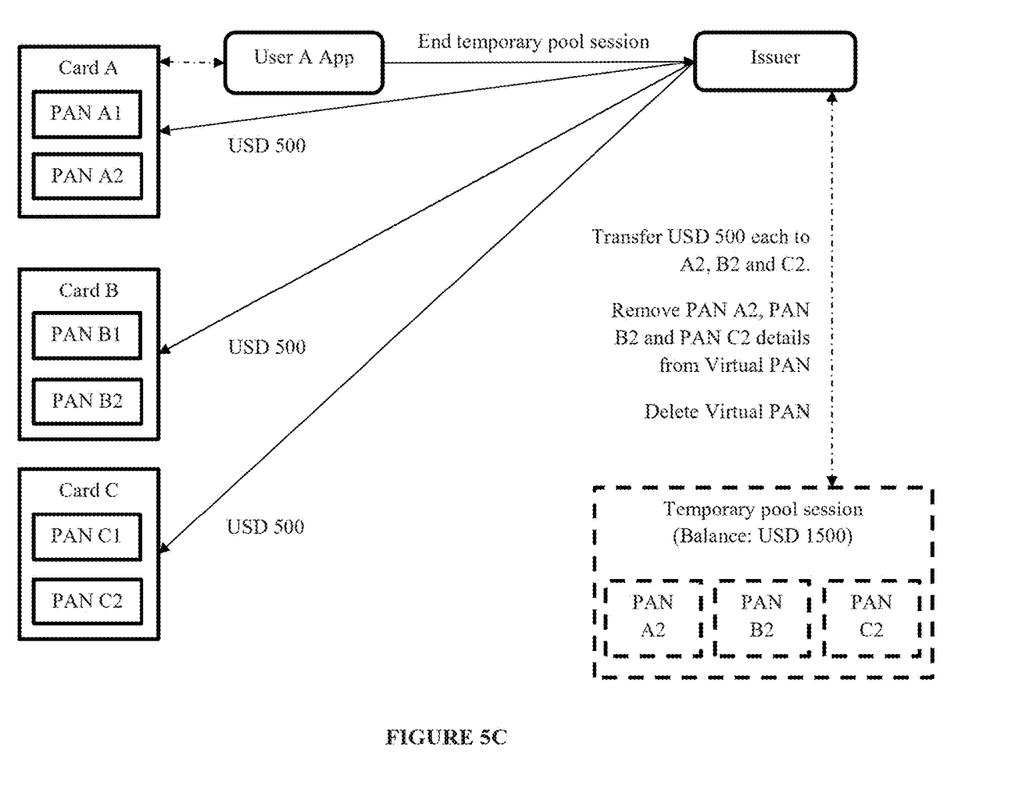

FIGS. 5A, 5B and 5C illustrate exemplary scenarios of using the temporary pool session for performing a transaction in accordance with some embodiments of the present disclosure.

FIG. 5A illustrates various interactions between the dual-chip payment cards and the transaction processing system 107 during creation of a temporary pool session. Here, the transaction processing system 107 may be an issuer entity such as, without limiting to, a bank, a payment gateway, a payment server and the like. As an example, suppose three dual-chip payment cards A, B and C, associated with three users A, B and C respectively, are involved in creation of the temporary pool session. Suppose, each of the users A, B and C interact with the issuer using mobile applications installed on smartphones of each of the users A, B and C. As an example, User A may request creation of the temporary pool session using 'User A App', installed on his/her smartphone. Here, the request for creation of the temporary pool session may include various information such as the virtual PAN of user A, user B and user C, along with a proportional credit amount to be collected from each of the users A, B and C. Subsequently, the Issuer may authorize the request and charge the proportional credit amount (for example USD 1000) from the primary account of each of the users A, B and C. Finally, the issuer may create the temporary pool session, which holds a total credit amount of USD 3000. The temporary pool session may be maintained until expiry of a predetermined expiry time 'H', wherein 'H' may be a value such as 2 days.

FIG. 5B illustrates steps involved in carrying out a transaction with a merchant using the temporary pool session. Once the temporary pool session is created, the temporary pool session may be associated with the dual-chip payment cards of each of the users A, B, and C. Thereafter, a transaction with a merchant, for example, a payment at a retail store, may be completed using the dual-chip payment card of any of the users A, B or C, since all the dual-chip payment cards are associated with the temporary pool session. Suppose, if the value of transaction is USD 1500, then the issuer may complete the transaction by deducting USD 1500 from the temporary pool session and crediting it to the merchant.

FIG. 5C illustrates steps involved in proportionally crediting the unused/balance credit amount of the temporary pool session to each of the users A, B and C. Suppose, after completing all the transactions, USD 1500 is left unused in the temporary pool session. In such scenarios, the issuer may transfer a proportional amount, for example, USD 500 to the primary/secondary account of each of the users A, B and C, before terminating the temporary pool session. Further, terminating the temporary pool session may include removing association between the temporary pool session and the dual-chip payment card of each of the users A, B and C.

Figure 6:
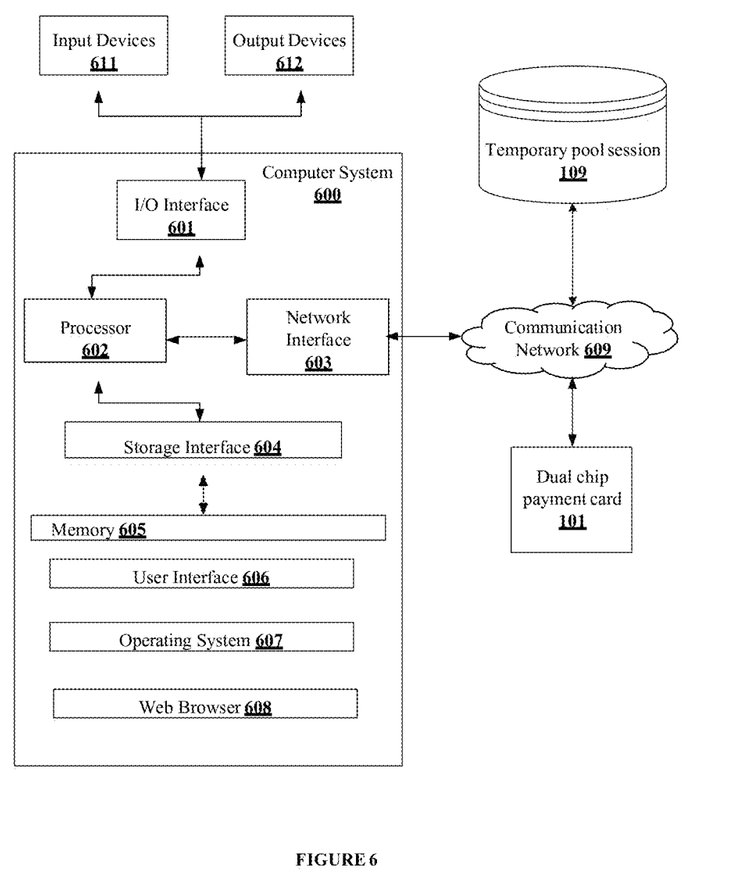
FIG. 6 is a block diagram of an exemplary computer system for implementing embodiments consistent with the present disclosure.

FIG. 6 is a block diagram of an exemplary computer system for implementing embodiments consistent with the present disclosure.

In some embodiments, the computer system 600 may be transaction processing system 107 that is used for splitting or sharing expenses between a plurality of users using a dual-chip payment card. The computer system 600 may include a central processing unit ("CPU" or "processor") 602. The processor 602 may include at least one data processor for executing program components for executing user or system-generated business processes. A user may include a person, a person using a device such as those included in this disclosure, or such a device itself. The processor 602 may include specialized processing units such as integrated system (bus) controllers, memory management control units, floating point units, graphics processing units, digital signal processing units, etc.

The processor 602 may be disposed in communication with input devices 611 and output devices 612 via I/O interface 601. The I/O interface 601 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 601, the computer system 600 may communicate with the input devices 611 and the output devices 612.

In some embodiments, the processor 602 may be disposed in communication with a communication network 609 via a network interface 603. The network interface 603 may communicate with the communication network 609. The network interface 603 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 603 and the communication network 609, the computer system 600 may interface with a dual-chip payment card 101 for receiving a request for creating a temporary pool session 109. Further, the communication network 609 may be used to connect to the temporary pool session 109, until the expiry of the temporary pool session 109.

In some embodiments, the communication network 609 can be implemented as one of the different types of networks, such as intranet or Local Area Network (LAN), Closed Area Network (CAN) and such. The communication network 609 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 609 may include a variety of network devices, including routers, bridges, servers, computing devices, storage devices, etc. In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, a user interface 606, an operating system 607, a web browser 608 etc. In some embodiments, the computer system 600 may store user/application data, such as the data, variables, records, etc. as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 606 may facilitate display, execution, interaction, manipulation, or operation of program components through textual or graphical facilities. For example, user interfaces may provide computer interaction interface elements on a display system operatively connected to the computer system 600, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 600 may implement the web browser 608 stored program components. The web browser 608 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX, DHTML, ADOBE® FLASH®, JAVASCRIPT®, JAVA®, Application Programming Interfaces (APIs), etc. In some embodiments, the computer system 600 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A dual-chip payment card comprising:
a primary chip proximate a first side of the dual-chip payment card and a secondary chip separate from the primary chip proximate a second side of the dual-chip payment card opposite of the first side of the dual-chip payment card, the primary chip associated with a primary account of one of a plurality of users having the dual-chip payment card and the secondary chip associated with a secondary account of the one of the plurality of users having the dual-chip payment card,
wherein the secondary chip of the dual-chip payment card is activated in response to being associated with a temporary pool session, the temporary pool session created based on a request for creating the temporary pool session for a plurality of users from the one of the plurality of users having the dual-chip payment card, the request including a proportional credit amount to be collected from each of the plurality of users and at least one user credential for each of the plurality of users,
wherein the temporary pool session is associated with a session identifier, wherein the temporary pool session automatically terminates after a configurable time period, and wherein the temporary pool session receives a credit for the proportional credit amount from a primary account of each of the plurality of users,
wherein associating the temporary pool session with the secondary chip of the dual-chip payment card comprises linking the secondary account of the one of the plurality of users having the dual-chip payment card to the temporary pool session, and wherein the secondary chip of the dual-chip payment card is active only when associated with the temporary pool session and until the temporary pool session terminates,
wherein the secondary chip of the dual-chip payment card is configured to initiate one or more transactions using the temporary pool session, each transaction comprising a transaction amount to be deducted from the temporary pool session, and
wherein the secondary chip of the dual-chip payment card is deactivated upon termination of the temporary pool session, and wherein a proportional amount of an unused credit amount remaining in the temporary pool session is returned to each of the plurality of users upon termination of the temporary pool session.

2. The dual-chip payment card of claim 1, wherein the primary chip of the dual-chip payment card is linked to a primary account of the one of the plurality of users.

3. The dual-chip payment card of claim 1, wherein the temporary pool session terminates upon request from the one of the plurality of users having the dual-chip payment card.

4. The dual-chip payment card of claim 1, wherein the secondary chip of the dual-chip payment card is configurable to be associated with one or more temporary pool sessions.

* * * * *